(12) United States Patent
Beetz et al.

(10) Patent No.: US 11,993,019 B2
(45) Date of Patent: May 28, 2024

(54) 3D PRINTING DEVICE HAVING A TEMPERATURE CONTROL DEVICE FOR APPLIED PRINT MATERIAL

(71) Applicants: Brose Fahrzeugteile SE & Co. Kommanditgesellschaft, Würzburg, Würzburg (DE); AIM3D GmbH, Rostock (DE)

(72) Inventors: Stefan Beetz, Barnin (DE); Clemens Lieberwirth, Rostock (DE); Vincent Morrison, Krakow am See (DE)

(73) Assignees: Brose Fahrzeugteile SE & Co. Kommanditgesellschaft, Würzburg (DE); AIM3D GmbH (DE)

( * ) Notice: Subject to any disclaimer, the term of this patent is extended or adjusted under 35 U.S.C. 154(b) by 118 days.

(21) Appl. No.: 17/436,408

(22) PCT Filed: Mar. 4, 2020

(86) PCT No.: PCT/EP2020/055691
§ 371 (c)(1),
(2) Date: Sep. 3, 2021

(87) PCT Pub. No.: WO2020/178335
PCT Pub. Date: Sep. 10, 2020

(65) Prior Publication Data
US 2022/0134662 A1    May 5, 2022

(30) Foreign Application Priority Data
Mar. 5, 2019    (DE) .................... 10 2019 202 942.6

(51) Int. Cl.
*B29C 64/295*    (2017.01)
*B22F 10/85*    (2021.01)
(Continued)

(52) U.S. Cl.
CPC ............ *B29C 64/295* (2017.08); *B22F 12/10* (2021.01); *B22F 12/20* (2021.01); *B33Y 30/00* (2014.12);
(Continued)

(58) Field of Classification Search
None
See application file for complete search history.

(56) References Cited

U.S. PATENT DOCUMENTS

| 2016/0207263 A1 | 7/2016 | Gordon et al. |
| 2017/0157845 A1 | 6/2017 | Bihari et al. |

(Continued)

FOREIGN PATENT DOCUMENTS

| CN | 105984142 A | 10/2016 |
| CN | 105984142 B | 10/2016 |

(Continued)

OTHER PUBLICATIONS

International Search Report dated Jun. 8, 2020, for PCT/EP2020/055691, 2 pages.
(Continued)

*Primary Examiner* — Nahida Sultana
*Assistant Examiner* — Virak Nguon
(74) *Attorney, Agent, or Firm* — Dickinson Wright PLLC

(57) ABSTRACT

A 3D printing device includes at least one printing nozzle for a layer-by-layer application of a printing material provided for the production of a component to be printed along a direction of application (R). The 3D printing device has a temperature control device that is configured and provided both to cool and warm already applied printing material in the region of the printing nozzle.

14 Claims, 2 Drawing Sheets

(51) Int. Cl.
  *B22F 12/10*     (2021.01)
  *B22F 12/20*     (2021.01)
  *B29C 64/393*    (2017.01)
  *B33Y 30/00*     (2015.01)
  *B33Y 50/02*     (2015.01)

(52) U.S. Cl.
  CPC ............ *B22F 10/85* (2021.01); *B29C 64/393* (2017.08); *B33Y 50/02* (2014.12)

(56) References Cited

U.S. PATENT DOCUMENTS

| | | | |
|---|---|---|---|
| 2017/0334137 A1 | 11/2017 | Nystrom et al. | |
| 2018/0079136 A1* | 3/2018 | Church | B29C 64/106 |
| 2019/0134898 A1* | 5/2019 | Zhao | B29C 64/165 |
| 2021/0078256 A1* | 3/2021 | Anegawa | B33Y 30/00 |

FOREIGN PATENT DOCUMENTS

| | | |
|---|---|---|
| CN | 207465884 U | 6/2018 |
| DE | 102016200522 A1 | 7/2017 |
| EP | 3106290 A1 | 12/2016 |
| EP | 3401081 A1 | 11/2018 |
| JP | 2005335380 A | 12/2005 |
| JP | 2017100304 A | 6/2017 |
| JP | 2018192624 A | 12/2018 |
| WO | 2016088048 A1 | 6/2016 |
| WO | 2018039261 A1 | 3/2018 |

OTHER PUBLICATIONS

Japanese Office Action for 2021-552531, English Translation attached to original, Dated Jan. 9, 2024, All together 5 Pages.
English Translation of Chinese Office Action for 202080016695.6, Dated Mar. 29, 2024, 10 Pages.

* cited by examiner

3D PRINTING DEVICE HAVING A TEMPERATURE CONTROL DEVICE FOR APPLIED PRINT MATERIAL

CROSS-REFERENCE TO RELATED APPLICATIONS

This application is the U.S. National Phase of PCT Application No. PCT/EP2020/055691 filed on Mar. 4, 2019, which claims priority to German Patent Application No. 10 2019 202 942.6 filed on Mar. 5, 2019, the disclosures of which are hereby incorporated in their entirety by reference herein.

TECHNICAL FIELD

The proposed solution relates to a 3D printing device having at least one printing nozzle for applying in layers a printing material provided for the production of a component to be printed.

BACKGROUND

In 3D printing, three-dimensional components are usually constructed in layers of one or more materials. Example Materials include plastics, resins, ceramics, and/or metals. In this connection, the so-called fused deposition modeling, or FDM for short, is known, for example. A component or respectively a workpiece is hereby constructed in layers from a fusible plastic or a melted material.

To produce the respective component layer-by-layer, printing material is applied to a printing plate via at least one printing nozzle of a 3D printing device, for example in the form of a so-called 3D printer, in a direction of application (of multiple possible directions of application). The respective component is thus constructed in layers, in a computer-aided fashion, by the printing material emerging from the printing nozzle.

SUMMARY

According to a first aspect, the proposed solution provides that the 3D printing device has a temperature control device which is configured and provided both to cool and warm already applied printing material in the region of the printing nozzle. Printing material present in the surrounding area of and thus, for example, locally underneath the printing nozzle may be cooled or warmed as required via a temperature control device.

In one embodiment, for example, a printing material lying in the direction of application is warmed in order to improve the adhesion of subsequently applied printing material. This may ensure that the already applied printing material is brought to a connection-compatible temperature and/or, in the case of materials filled with glass fibers, the already applied printing material is warmed again to a point where printing material newly applied hereon from the printing nozzle may penetrate the already applied printing material. At a different time, for example, using another printing material in another production process employing the same 3D printing device or to form a specific thin-walled section of the component to be printed, or at the same time as warming printing material, it is also possible with the proposed temperature control device to cool printing material which has been applied immediately beforehand by the printing nozzle. Such cooling serves, for example, to prevent the applied printing material from flowing away or deliquescing and to cure the printing material. It may also be provided to switch between cooling and warming in the region of the printing nozzle depending on the construction time of the current layer of printing material and/or depending on a section of the component to be produced, for example a bridge or an overhang. This may increase the flexibility by the proposed 3D printing device when manufacturing three-dimensional components.

The temperature control device may be configured to apply new printing material by the printing nozzle for the purpose of warming already applied printing material lying in the direction of application. The temperature control device may be consequently configured to warm already applied printing material when new printing material is applied hereto by the printing nozzle.

The temperature control device may be configured for the purpose of cooling printing material applied by the printing nozzle that has been applied beforehand by the printing nozzle. Printing material may be cooled via the temperature control device after it has been applied by the nozzle and possibly whilst the printing nozzle is being shifted further in the direction of application for the purpose of applying a new layer of printing material. Thus, in an embodiment, a cooling flow of fluid may be generated with the aid of the temperature control device in the direction of printing material that has just been applied by the printing nozzle. Cooling fluid is hereby blown out via the temperature control device in the direction of printing material which has just been applied by the printing nozzle.

At least one fluid flow with warmed or cooling fluid may be generated via the temperature control device for the purpose of warming and/or cooling applied printing material. It may be provided that either warmed or cooling fluid may be employed via the temperature control device for a fluid flow and different fluid reservoirs are, for example, present for this purpose or the temperature control device has at least one warming and/or cooling element in order to warm or cool in a targeted fashion a fluid which is to be blown out.

The temperature control device may have at least one support with at least one outflow opening for the fluid. A corresponding support defines a flow path for the fluid flow to be generated such that the fluid flow is directed at the at least one outflow opening of the support in the direction of the printing material to be cooled or warmed. The at least one support may be provided in the region of the printing nozzle such that fluid flowing out of the at least one outflow opening strikes the already printed printing material in the immediate surrounding area of the printing nozzle.

An embodiment provides, for example, that at least one first outflow opening for generating a fluid flow provided to warm the printing material and at least one second outflow opening for generating a fluid flow provided to cool the printing material are present on the at least one support. In this connection, different outflow openings may consequently be present on the at least one support to which warmed fluid or cooling fluid is conveyed depending on the application. At least one outflow opening of a support may of course also be configured and provided to allow different fluids and/or a fluid with different temperatures to flow out via it.

Alternatively or additionally, at least two supports may be part of the temperature control device. Different supports may also be provided on the 3D printing device for generating different fluid flows and/or for different fluids. Depending on which type of fluid flow (with regard to the temperature and/or an outflow opening) or which type of fluid, e.g., which type of gas, is to flow out in a targeted fashion, one or the other support may, for example, be employed.

In an embodiment, the temperature control device has at least one valve, e.g., a multiport valve for controlling the inflow of different fluids and/or for controlling the inflow of a fluid via different fluid paths. In the above-mentioned embodiment, the temperature control device makes different fluid paths available in order, for example, to allow warmed fluid to flow via a first fluid path and cooling fluid to flow via a second fluid path and finally to convey it in the direction of the applied printing material. The inflow may be regulated correspondingly via the at least one valve such that one fluid path may, for example, not be employed depending on a position of the valve, whilst another fluid path is available.

The temperature control device may be configured and provided with the at least one valve to control an inflow of a warmed fluid via a different fluid path than the inflow of a cooling fluid. It may, for example, be controlled, via the at least one valve, to which support or which of a plurality of different supports and/or to which outflow openings of a support fluid flows. Which support and/or which outflow opening or openings are supplied with fluid may hereby depend on which fluid it is intended to be employed and/or whether the fluid is provided for warming or cooling purposes.

As an alternative or in addition to generating a fluid flow, the temperature control device may have at least one emitter for warming already applied printing material. Such an emitter includes, for example, a laser, an LED, or an infrared emitter via which printing material may be warmed locally by radiant heat in the region of the printing nozzle.

The temperature control device may be coupled electronically to at least one sensor device in order to control electronically (and hence at least partially or completely automatedly) the degree of warming or cooling (and hence, for example, the temperature of a fluid employed or the amount of radiated radiant heat of a possible emitter) depending on at least one sensor signal which is indicative of the temperature of the printing material to be warmed or to be cooled. In this embodiment, a feedback loop is thus provided in order to limit an energy input or a cooling effect respectively to a specified value which is dependent on the temperature of the printing material.

The at least one sensor device may include, for example, one or more thermal imaging cameras, the image data of which are evaluated in a computer-assisted fashion to calculate a printing material temperature and are employed to generate a sensor signal. Alternatively or additionally, one or more movable sensors may be provided directly on the print head so that they may be shifted electronically in a controlled fashion. Alternatively or additionally, a fixed sensor or one which may be shifted only slightly may be provided in the region of the print head which may detect a temperature of the applied printing material with the aid of a movably mounted mirror which may be shifted electronically in a controlled fashion.

In an embodiment, the temperature control device has an electronic control system that is configured to control warming or cooling depending on the direction of application in which the printing nozzle is shifted. Depending on which of multiple possible directions of application in which the printing nozzle is shifted with respect to a printing platform, it is thus possible in such an embodiment to vary whether it is intended for warming or cooling of the printing material to take place in the surrounding area of the printing nozzle and/or whether only a part and then also which part of the temperature control device is employed for the warming or cooling. If the temperature control device has, for example, a plurality of supports and a plurality of outflow openings, the electronic control system is, for example, configured to supply with fluid only those supports and hence only those outflow openings via which a fluid flow in the direction of application may be generated in front of the printing nozzle for warming printing material, or via which a fluid flow in the opposite direction to the direction of application may be generated behind the printing nozzle for cooling printing material.

In an embodiment, the electronic control system is, for example, configured to control warming or cooling depending on the direction of application by a shiftable support, for example an annular nozzle, being rotated by the electronic control system in a targeted fashion with the direction of application (and consequently a printing path). In such a way, a cooling jet may be oriented at all times after the printing or respectively oriented backward with respect to the direction of application in order to cool printing material which has just been applied. At the same time, a heat source may precede the printing and hence be directed in the direction of application in order to warm a region on which printing material will shortly be applied.

In a further aspect, a 3D printing device having a temperature control device including a plurality of temperature control elements provided for cooling already applied printing material and/or a plurality of temperature control elements provided for warming already applied printing material, wherein the temperature control elements are provided on a section of a support of the temperature control device which extends at least partially around the printing nozzle.

The temperature control elements may, for example, be emitters for warming already applied printing material and consequently, for example, a laser, an LED, and/or an infrared emitter. Outflow openings for a fluid flow with warmed, e.g., heated fluid, or with cooling fluid are, however, also understood as a temperature control element.

In a 3D printing device according to the second aspect, corresponding temperature control elements are situated on a section of the support which extends partially around the printing nozzle and hence covers a defined region along the periphery of the printing nozzle for local warming or cooling of printing material. The support may, for example, be formed such that it extends in an arc of a circle or in a ring around the printing nozzle. That section of the support which has the temperature control elements and extends at least partially around the printing nozzle may thus follow the course of a circular line around the printing nozzle.

In an embodiment, the temperature control device has an electronic control system that is configured to employ different temperature control elements depending on in which direction of application the printing nozzle is shifted. This includes, for example, that the electronic control system is configured to employ only one or only some of the plurality of temperature control elements depending on the direction of application in order to warm or cool in a targeted fashion printing material applied in front of or behind the printing nozzle, for example with respect to the direction of application.

The temperature control elements may also be situated on different supports which at the same time form, for example, a flow generating element such as, for example, an annular nozzle around the printing nozzle.

The two above discussed aspects of a 3D printing device may of course also be implemented in a single 3D printing device.

BRIEF DESCRIPTION OF THE DRAWINGS

The attached drawings illustrate by way of example possible embodiments of the proposed solution.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In some designs, e.g., WO 2018/039261 A1, prewarming an already applied printing material, lying in the direction of application, of a first layer before a further second layer of printing material is applied via the printing nozzle is performed. Corresponding prewarming of the already applied layer of printing material here serves to improve the adhesion of the newly applied printing material to the already present layer. WO 2018/039261 A1 describes, for example, the use of a laser or a flow of hot gas to warm the printing material which lies in the direction of application and has already been applied in advance.

Figure 4:
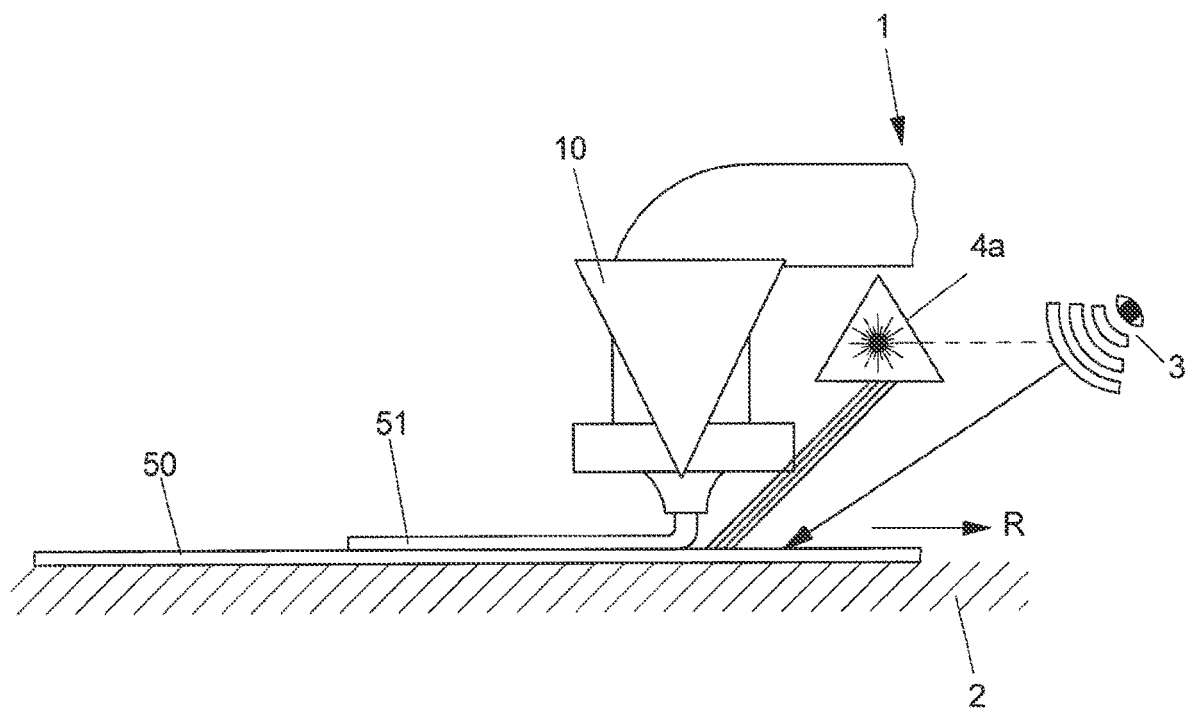
FIG. 4 shows schematic of a 3D printing device which may be equipped with a printing nozzle according to one of FIG. 1, 2, or 3, with a schematic illustration of a sensor system coupled to the corresponding temperature control device.

FIG. 4 shows schematically a 3D printing device 1, with a printing nozzle 10, via which printing material for constructing a component or a workpiece respectively in layers may be applied to a printing platform 2. The printing nozzle 10 is hereby shifted, by way of example, in a direction of application R.

In the embodiment shown in FIG. 4, a layer of printing material 50 is already present on the printing platform, to which a second layer of printing material 51 is applied by the printing nozzle 10. The 3D printing device operates, for example, according to fused deposition modeling (FDM for short). The cooling of the applied printing material 50 begins at the same time as the first application of the printing material 50 to the printing platform 2. When the print head of the 3D printing device 1 with the printing nozzle 10 returns to the same point, the previously applied printing material 50 is significantly cooler than the new printing material 51 which is to be applied. This may have a negative effect on the connection of the two strands of material, and also on the strength of the component produced hereby.

Against this background, the embodiment in FIG. 4 provides to locally warm via a laser 4a printing material 50, lying in the direction of application R, of the previously applied layer 50. A region of the already applied printing material 50 to which the new printing material 50 is applied immediately afterward is warmed by virtue of this local warming by the laser 4a (or another emitter such as, for example, an infrared emitter or by a fluid flow with warmed fluid) and the associated input of energy into the printing material 50. As a result, the adhesion of the newly applied printing material 51 to the previously applied printing material 50 may be improved. Hybrid printing processes may also be implemented therewith in which plastic material with metallic powder is printed. As a result of the targeted input of heat, the printed metallic powder may here be subsequently fused in order, for example, to form metallic structures, for example in the form of at least one strip conductor, inside the printed plastic.

The input of energy into the already applied printing material 50 is controlled, depending on a determined temperature of the printing material 50, via a sensor system 3 which is coupled to a temperature control device 4 having the laser 4a and has one or more sensor devices. The sensor system 3 includes, for example, optical measuring devices and/or at least one temperature sensor. As an alternative or in addition to a temperature sensor, the sensor system 3 includes, for example, one or more thermal imaging cameras and is configured to calculate, in a computer-assisted fashion, a temperature of the printing material 50 in the region of the printing nozzle 10 and to actuate the laser 4a depending on this temperature determined in a computer-assisted fashion.

Figure 1:
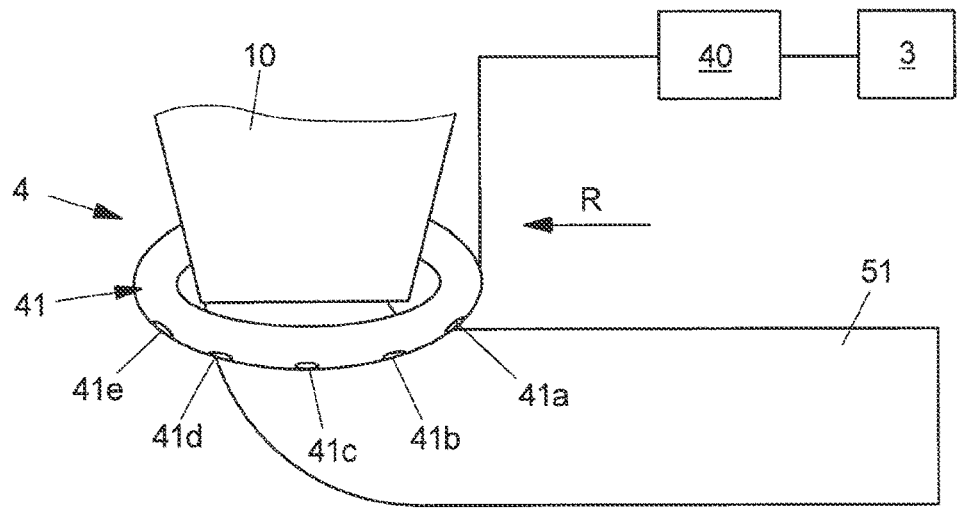
FIG. 1 shows a detail of a first embodiment of a proposed 3D printing device with a view of a printing nozzle on which an encircling support in the form of a ring with a plurality of temperature control elements for cooling or warming applied printing material, as required, is provided.

In an embodiment according to FIG. 1, an encircling ring-shaped support 41 is provided in the region of the printing nozzle 10. This ring-shaped support 41 is part of a temperature control device 4 via which printing material 50 of a first layer, applied in a preceding cycle, is warmed in a targeted fashion and/or via which the printing material 51 of a subsequent layer which has just been applied to the former layer may be cooled in a targeted fashion.

A plurality of temperature control elements 41a to 41e are spaced apart from one another on the support 41, e.g., spaced apart from one another equidistantly, and are provided so that they are distributed over the outer circumference of the ring-shaped support 41. Each temperature control element 41a to 41e may here be formed by an emitter for generating radiant heat or by an outflow opening for fluid such that the support 41 may be formed as an emitter ring or annular nozzle. Depending on whether printing material 50, 51 is intended to be cooled or warmed and in which direction of application R the printing nozzle 10 for applying new printing material 51 in layers is shifted, only one or only some of the temperature control elements 41a to 41e may be active.

If, for example, a plurality of outflow openings 41a to 41e are provided so that they are distributed on the circumference of the ring-shaped support, warmed fluid may, for example, flow out at outflow openings 41d and 41e lying in the direction of application R in order to locally warm, e.g., prewarm, printing material 50, of an already present layer, which lies in front of and underneath the printing nozzle 10, before printing material 51 applied at the printing nozzle 10 for a subsequent layer comes into contact with this printing material 50. Alternatively or additionally, cooling fluid may flow out at outflow openings 41a, 41b lying in the opposite direction to the direction of application R such that a cooling fluid flow may be generated in the direction of the printing material 51 which has just been applied in order to prevent deliquescence of this printing material 51. Applied printing material 50, 51 may accordingly be selectively warmed or respectively actively heated or cooled with the temperature control device 4 shown. Depending on the construction time of the current layer and/or depending on the section of the component to be produced, it may hereby be controlled in a targeted fashion whether warming or cooling is to take place and in which direction and at which point/points along the circumference of the printing nozzle 10 a fluid flow is to be generated.

The temperature control device 4 includes an electronic control system 40 for the purpose of automating the process. This electronic control system 40 may also be coupled, for example, to the sensor system 3 in order to control the degree of warming and/or cooling depending on what temperature the corresponding printing material 50 or 51 has.

In an alternative embodiment, the electronic control system 40 is configured to control warming or cooling depending on the direction of application by the support 41 being rotatably mounted around the printing nozzle 10d and being capable of being rotated by the electronic control system in a targeted fashion with the direction of application (and consequently a printing path). In this way, a cooling jet may be oriented backward at all times relative to the direction of application in order to cool printing material that has just been applied. At the same time, heat may be directed in the direction of application in order to warm a region on which printing material will be applied shortly. Alternatively or additionally, the outflow openings 41a to 41e may be closed and opened in a targeted fashion, individually or in groups, in an electronically controlled fashion via valves, e.g., piezoelectric valves, in order to be able to orient cooling and/or warming in a targeted fashion, e.g., depending on a current direction of application of the printing material and hence on a printing path.

Figure 2:
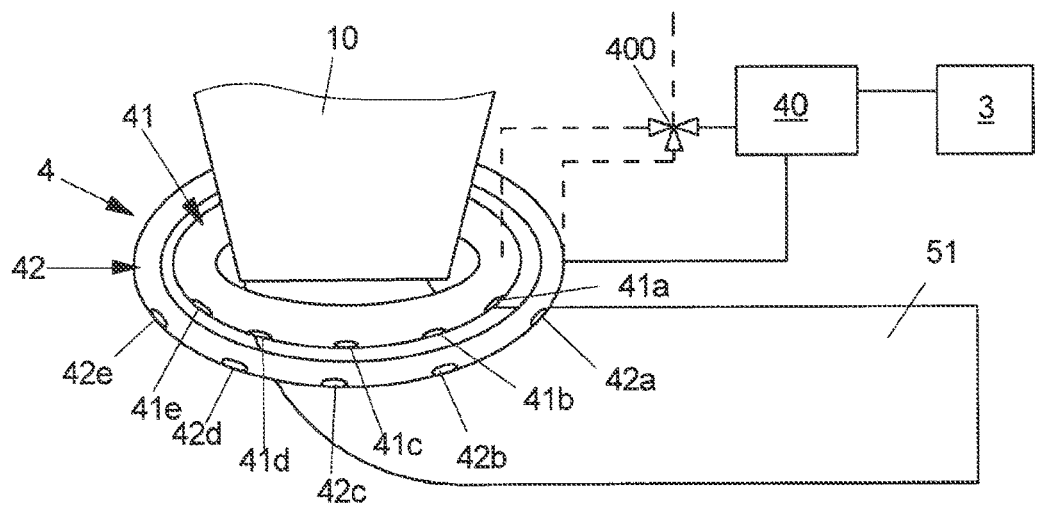
FIG. 2 shows a further embodiment of a proposed 3D printing device with two concentric ring-shaped supports with an optional valve control system for temperature control elements, formed as outflow openings, on the supports.

Instead of a single support 41, the alternative embodiment in FIG. 2 provides two ring-shaped supports 41 and 42 of the temperature control device 4 that encircle the printing nozzle 10 concentrically to each other. Fluid flows provided only to warm the printing material 50 are hereby generated, for example, via a support 41 situated on the inside and its outflow openings 41a to 41e. In contrast, respective fluid flows with cooling fluid are generated via outflow openings 42a to 42e of the support 42 situated on the outside. The fluid is, for example, in both cases the same fluid, e.g., air. The air may either be warmed or be conveyed to a support 41 or the other support 42 in an unwarmed or cooled state, depending on whether the air is employed for warming or cooling purposes and via which of the supports 41, 42 it is intended for this air to be blown out. The air is, for example, supplied via a compressed air connection.

A valve control system with at least one (multiport) valve 400 may optionally be present to control the inflow to the supports 41, 42. This valve 400 is then also controlled via the electronic control system 40 of the temperature control device 4.

Figure 3:
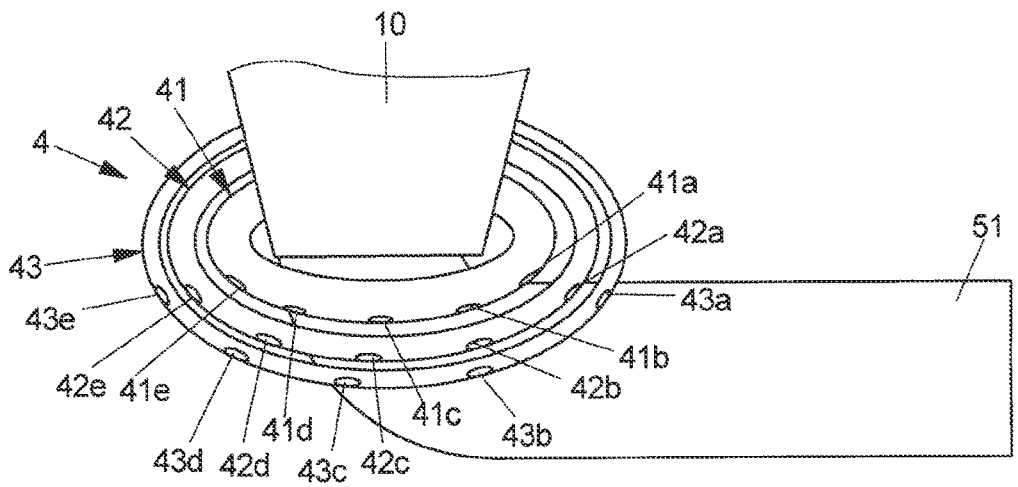
FIG. 3 shows, in a view that matches that in FIGS. 1 and 2, a further embodiment of a proposed 3D printing device with three in each case ring-shaped supports arranged concentrically relative to one another.

In the embodiment in FIG. 3, three ring-shaped supports 41, 42, and 43 concentrically encircling the printing nozzle 10 are provided. An alternative process gas in addition to warm and cold air may, for example, when required flow out via an additional outer ring-shaped support 43 with outflow openings 43a to 43e. Such a process gas used for cooling and/or warming purposes may, for example, be employed when a reactive printing material (for example, a carbon fiber reinforced plastic, a glass fiber reinforced plastic, or a specific metallic powder or binding agent) is to be printed which would oxidize undesirably during cooling or warming with air.

In each of the embodiments shown in FIGS. 1, 2, and 3, the temperature control device 4 may have suitable warming and/or cooling elements in order to warm or cool, as required, a respective fluid to be used. Moreover, the use of air as the fluid for generating a warming or cooling fluid flow is of course just an example. Thus, a process gas, e.g., an inert process gas, may also be used as an alternative embodiment in FIG. 1 or 2. A fused deposition modeling process using PA66 GF35 may, for example, be readily effectively performed with the alternative embodiments shown. Hereby, on the one hand, depending on the design-specific or material-specific requirements to be produced, active heating of previously applied printing material 50 may be implemented using warm air (at a temperature of approximately 150° C.) in order to obtain good adhesion and, on the other hand, cooling of the printing material 51 which has just been applied also needs to be provided, but for example in the case of sections of the component with a small cross-section and/or a small wall thickness, in order to prevent this printing material 51 from flowing away or deliquescing. A corresponding component heating and cooling is hereby integrated, via the temperature control device 4, in the region of the printing nozzle 10 and hence at the print head of the 3D printing device, for example, according to the alternative embodiment in FIG. 2 via a plurality of supports 41, 42, 43, with in each case a plurality of outflow openings 41a-41e, 42a-42e, in the shape of rings which encircle the printing nozzle 10.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF DESIGNATIONS 1 3D printing device
10 printing nozzle
2 printing platform
3 sensor system
4 temperature control device
40 electronic control system
41, 42, 43 support
41a-41e outflow opening/emitter (temperature control element)
42a-42e outflow opening/emitter (temperature control element)
43a-43e outflow opening/emitter (temperature control element)
4a laser
400 multiport valve
50, 51 printing material
R direction of application While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A 3D printing device comprising:
   at least one printing nozzle configured to provide a layer-by-layer application of a printing material for the production of a component formed by printing along a direction of application; and
   a temperature control device configured to cool and warm already-applied printing material,
   wherein the temperature control device includes,
   a ring-shaped support including a number of sections and extending around the at least one printing nozzle,
   a first plurality of temperature control elements configured for cooling the already applied printing material, and
   a second plurality of temperature control elements provided for warming the already applied printing material, wherein the first and second plurality of temperature control elements are provided on each of the number of sections of the ring-shaped support.

2. The 3D printing device of claim 1, wherein the temperature control device is configured to generate at least one fluid flow with a warmed fluid and at least one fluid flow with a cooling fluid for warming and cooling the applied printing material, respectively.

3. The 3D printing device of claim 2, wherein the first and second plurality of temperature control elements include at least one outflow opening for the warming fluid and the cooling fluid.

4. The 3D printing device of claim 3, wherein the at least one outflow opening includes a first outflow opening for generating warming fluid flow provided to warm the printing material and a second outflow opening for generating a cooling fluid flow provided to cool the printing material.

5. The 3D printing device of claim 3, wherein the temperature control device includes at least two supports wherein the at least two supports include the ring-shaped support.

6. The 3D printing device of claim 2, wherein the temperature control device includes at least one valve configured to control at least one of an inflow of different fluids and an inflow of a fluid via different fluid paths.

7. The 3D printing device of claim 6, wherein the at least one valve is further configured to control an inflow of a warmed fluid via a fluid path of the different fluid paths that is different than another fluid path of the different fluid paths of the inflow of a cooling fluid.

8. The 3D printing device of claim 1, wherein the temperature control device includes at least one emitter configured to warm the already applied printing material.

9. The 3D printing device of claim 1, wherein the temperature control device includes an electronic control system configured to control warming or cooling depending on the direction of application in which the printing nozzle is shifted.

10. A 3D printing device comprising:
    at least one printing nozzle configured to provide a layer-by-layer application of a printing material for production of a component to be printed along a direction of application; and
    a temperature control device including,
    a first ring-shaped support,
    a second ring-shaped support, the first and second support extending around the printing nozzle,
    a first plurality of temperature control elements provided for cooling already applied printing material, and
    a second plurality of temperature control elements provided for warming the already applied printing material, wherein the first and second plurality of temperature control elements are provided on each of the first and second ring-shaped supports of the temperature control device.

11. The 3D printing device of claim 10, wherein the temperature control device includes an electronic control system configured to employ different temperature control elements of the first and second plurality of temperature control elements depending on in which direction of application the printing nozzle is shifted.

12. The 3D printing device of claim 10, wherein the first ring-shaped support is arranged concentrically with the second ring-shaped support.

13. The 3D printing device of claim 10, wherein the temperature control device includes a third ring-shaped support.

14. The 3D printing device of claim 13, wherein the third ring-shaped support includes outflow openings for an inert process gas.

* * * * *